United States Patent Office 2,952,766
Patented Sept. 13, 1960

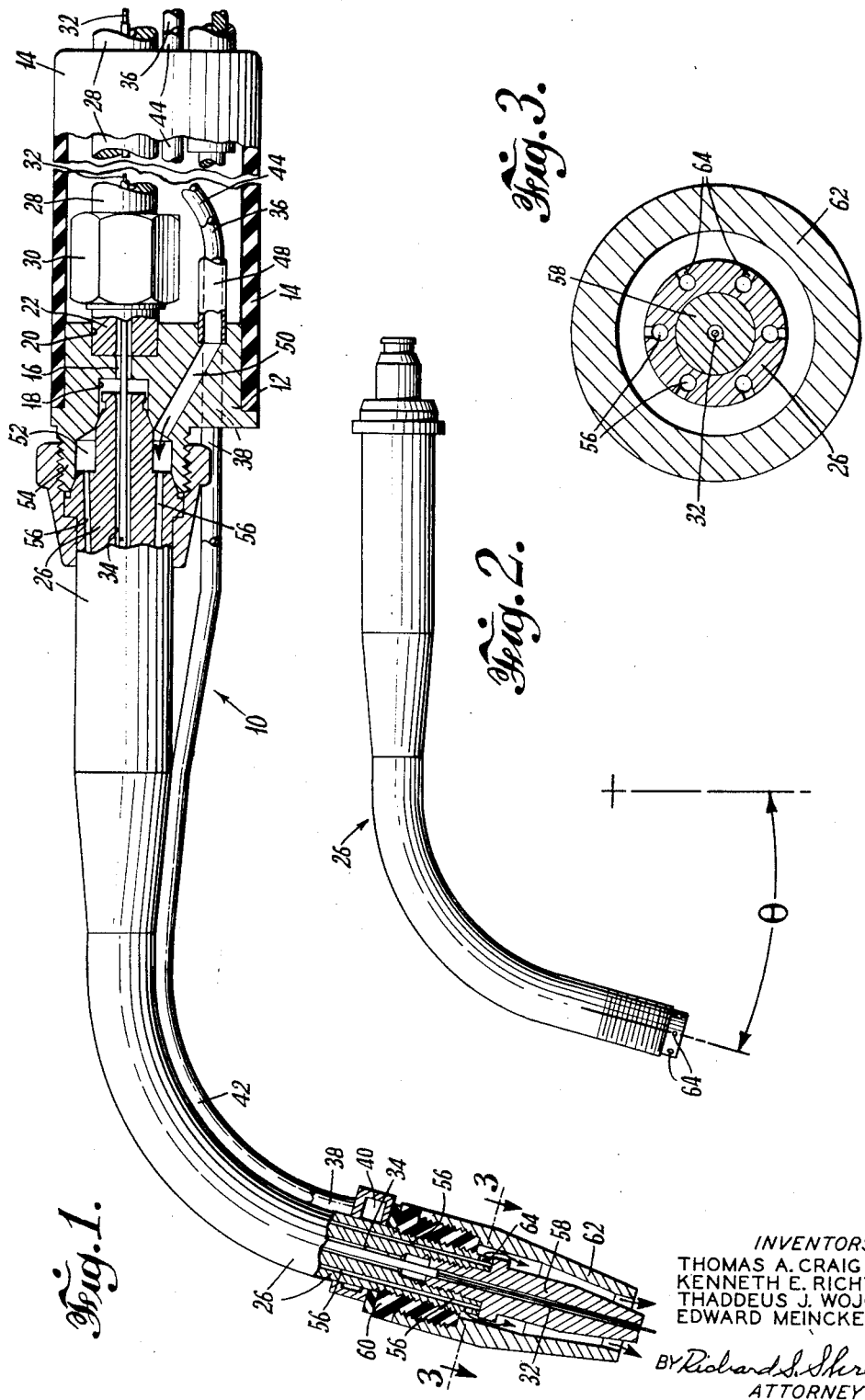
Sept. 13, 1960   T. A. CRAIG ET AL   2,952,766
BLOWPIPE TYPE SIGMA TORCH
Filed June 17, 1957
INVENTORS
THOMAS A. CRAIG
KENNETH E. RICHTER
THADDEUS J. WOJCIAK
EDWARD MEINCKE
BY Richard S. Shreve
ATTORNEY

2,952,766
BLOWPIPE TYPE SIGMA TORCH

Thomas A. Craig, Port Reading, Kenneth E. Richter, Whippany, Thaddeus J. Wojciak, Elizabeth, and Edward Meincke, Summit, N.J., assignors to Union Carbide Corporation, a corporation of New York Filed June 17, 1957, Ser. No. 666,101

5 Claims. (Cl. 219—130)

This invention relates to blowpipe type sigma torches, and more particularly to torches for inert gas shielded metal arc welding for example as shown in Scheller et al. Patent No. 2,754,395.

Sigma torches have heretofore been of the conventional pistol grip type with a straight elongated barrel. This construction is impractical for welding in difficultly accessible areas, and lacks the maneuverability for many applications.

The main objects of the present invention are therefore to avoid those difficulties and to provide a sigma torch having the maneuverability of the conventional oxy-acetylene blowpipe.

The present invention is characterized by the use of a curved wire guide tube for the sigma torch, and the feed of the wire electrode through the rear of the torch handle. The projecting portion of the wire guide tube projecting from the handle, and the gas passages formed in the tube, are all curved to facilitate manipulation of the wire guide tube, gas directing nozzle and contact tip. Preferably when welding with small diameter wires the contact tip projects out of the gas directing nozzle to facilitate visibility of the arc in operation.

In the drawings:

Fig. 1 is a side elevation with parts broken away and shown in section of a torch according to the preferred embodiment of the present invention;

Fig. 2 is an elevation of the wire guide tube shown in Fig. 1;

Fig. 3 is a section taken along the line 3—3 of Fig. 1.

As shown in Fig. 1 the blowpipe 10 is provided with a body 12 to the annular surface of which the front end of a cylindrical hollow handle 14 is secured. The body 12 is provided with a wire passage 16, and opposed sockets 18 and 20 in axial alignment with such passage. A nipple 22 is fixed in the rear socket 20, and the reduced rear end of the wire guide tube 26 fits in the front socket 18. A flexible wire conduit 28 is connected at its outlet end to the nipple 22 within the hollow handle 14 by means including a nut 30, so that a weld wire 32 fed through the conduit 28 passes through the nipple 22 and passage 16 and into a longitudinal way 34 provided therefor in the wire guide tube 26.

An inlet water hose 36 enters the rear of the handle 14 and is connected therewithin to a water pipe 38 passing through the body 12 and along outside of the wire guide tube 26 to an annular chamber 40 surrounding the outer end thereof. A parallel water outlet pipe 42 extends from the chamber 40 along the outside of the wire guide tube and through the body 12 to an outlet hose 44.

A gas supply conduit 48 enters the handle 14 and is connected to a passage 50 in the metal body 12. This passage leads back to an annular gas chamber 52 between the inner end of the wire guide tube 26 and an annular forwardly projecting flange 54 on the body 12.

As shown in Fig. 3 the wire guide tube 26 is provided with a plurality of annularly spaced longitudinally extending gas passages 56 receiving gas from the manifold 52. The bottom of these passages are closed by a contact tip 58 screwed into the bottom of the wire guide tube 26.

An insulating bushing 60 is screwed onto the contact end of the wire guide tube 26, and a gas directing nozzle 62 is screwed onto this bushing. Radial holes 64 in the bottom of the wire guide tube 26 pass the gas to the interior of the nozzle 62. The contact tip 58 projects out of the nozzle or gas cup 62.

The extension of the contact tip from the gas cup has a definite purpose. In welding with small wires, such as 0.020 and 0.030 in. diameter, the contact tip-to-work distance is critical due to resistance heating of the welding wire. For example, when the contact tip-to-work distance is varied ⅛ in., with a constant-potential type power supply and constant wire feed speed, the current will change approximately 20% when using 0.020 in. diameter wire. This change in current would adversely affect welding contour and penetration. By keeping the distance between contact tip and work as short as possible higher currents are obtainable for a given deposition rate. Higher current results in deeper penetration, which of course is desirable.

Unusually good visibility is an inherent advantage of this arrangement. When working with small-diameter wires, it is desirable to maintain a contact tip-to-work distance of from ¼ in. to ½ in. Extending the contact tip beyond the gas cup enables the operator to see both the arc and welding puddle so as to control the distance between such tip and workpiece.

The contact tip 58 is preferably made of ⅜ in. diameter, heat treated conductivity bronze material threaded at its upper end. This piece screws into the wire guide tube 26. Current is picked up by the small-diameter wire as it passes through a hole provided in the contact tip 58. Metal nozzle 62 screws into the insulator 60 and is pinned thereto so as to form one unit. This unit is then screwed onto the nozzle extension. Since current is being carried to the contact tip by the wire guide tube 26, this insulator prevents current from flowing to the metal nozzle.

What is claimed is:

1. Gas shielded arc torch comprising a handle, an electrode wire guide tube mounted in said handle and having a portion projecting therebeyond, a gas manifold at the handle end of said wire guide tube, said guide tube having a plurality of annularly spaced longitudinally extending gas passages therein receiving gas from said manifold, a contactor tip carried by the front end of said projecting portion closing the bottom of said gas passages therein, said guide tube having radial holes extending out from said gas passages, and a gas directing nozzle surrounding said contact tip and receiving gas from said holes.

2. Gas shielded arc torch comprising a handle, an electrode wire guide tube mounted in said handle and having a portion projecting therebeyond, a contactor tip carried by the front end of said projecting portion said handle and guide tube having complementary recesses forming therebetween, a gas manifold at the handle end of said wire guide tube; said guide tube having a plurality of annularly spaced longitudinally extending gas passages therein receiving gas from said manifold, and a gas directing nozzle surrounding said contact tip and receiving gas from said annularly spaced passages.

3. Gas shielded arc torch comprising a handle, an electrode wire guide tube mounted in said handle and having a portion projecting therebeyond, a contactor tip carried by the front end of said projecting portion, a gas manifold at the handle end of said wire guide tube; said guide tube having a plurality of annularly spaced longitudinally extending gas passages therein receiving gas from said manifold and converging therefrom toward said contactor tip, and a gas directing nozzle surrounding said contactor tip and receiving gas from said converging gas passages.

4. Gas shielded arc torch comprising a handle, an electrode wire guide tube mounted in said handle and having a portion projecting therebeyond, a contactor tip carried by the front end of said projecting portion and having a straight bore through which the wire passes, gas passage means extending along said wire guide tube, and a gas directing nozzle surrounding said straight bored contact tip and receiving gas from said gas passage means, a cooling jacket surrounding the front end of said wire guide tube adjacent said gas directing nozzle, said wire guide tube between said handle and said straight bored contact tip being permanently curved into a rigid formation, and water inlet and outlet tubes extending from said water jacket along the concave side of said guide tube and through said handle.

5. Gas shielded arc torch comprising a handle, an electrode wire guide tube mounted in said handle and having a portion projecting therebeyond, a contactor tip carried by the front end of said projecting portion, a gas manifold at the handle end of said guide tube, means forming a plurality of annularly spaced longitudinally extending gas passages receiving gas from said manifold, and a gas directing nozzle surrounding said contact tip and receiving gas from said annularly spaced passages, the diameter of said contactor tip being greater than the annulus of said passages at the front end of said projecting portion.

References Cited in the file of this patent

UNITED STATES PATENTS

| | | |
|---|---|---|
| 2,544,711 | Mikhalapov | Mar. 13, 1951 |
| 2,606,267 | McElrath | Aug. 5, 1952 |
| 2,683,791 | Ruehlemann et al. | July 13, 1954 |
| 2,736,787 | Welch | Feb. 28, 1956 |
| 2,761,049 | McElrath et al. | Aug. 28, 1956 |
| 2,767,302 | Brashear | Oct. 16, 1956 |
| 2,768,280 | Renaudie | Oct. 23, 1956 |
| 2,797,306 | Qualey | June 25, 1957 |
| 2,817,749 | Flood et al. | Dec. 24, 1957 |
| 2,881,305 | Wojciak et al. | Apr. 7, 1959 |

FOREIGN PATENTS

| | | |
|---|---|---|
| 1,040,756 | France | May 27, 1953 |